(12) United States Patent
Jensen et al.

(10) Patent No.: US 6,185,612 B1
(45) Date of Patent: Feb. 6, 2001

(54) SECURE DISTRIBUTION AND USE OF WEIGHTED NETWORK TOPOLOGY INFORMATION

(75) Inventors: Del Jensen, Orem; Stephen R Carter, Spanish Fork, both of UT (US)

(73) Assignee: Novell, Inc., Provo, UT (US)

( * ) Notice: Under 35 U.S.C. 154(b), the term of this patent shall be extended for 0 days.

(21) Appl. No.: 09/182,978

(22) Filed: Oct. 29, 1998

(51) Int. Cl.[7] .................................................. G06F 13/00
(52) U.S. Cl. .......................... 709/223; 709/220; 709/238; 709/242; 709/243; 709/249
(58) Field of Search .................................. 709/220, 221, 709/223, 224, 225, 226, 238, 241, 242, 243, 244, 249; 713/201

(56) References Cited

U.S. PATENT DOCUMENTS

| | | | |
|---|---|---|---|
| 4,873,517 | 10/1989 | Baratz et al. | 340/825.03 |
| 5,151,989 | 9/1992 | Johnson et al. | 395/600 |
| 5,204,961 | 4/1993 | Barlow | 395/725 |
| 5,321,815 | 6/1994 | Bartolanzo, Jr. et al. | 395/200 |
| 5,349,642 | 9/1994 | Kingdon | 380/25 |
| 5,365,523 | 11/1994 | Derby et al. | 370/85.2 |
| 5,398,012 | 3/1995 | Derby et al. | 340/825.03 |
| 5,634,011 | 5/1997 | Auerbach et al. | 395/200.15 |
| 5,757,920 | 5/1998 | Misra et al. | 380/25 |
| 5,758,083 * | 5/1998 | Singh et al. | 709/223 |
| 5,758,344 | 5/1998 | Prasad et al. | 707/10 |
| 5,781,534 | 7/1998 | Perlman et al. | 370/248 |
| 5,805,818 | 9/1998 | Perlman et al. | 395/200.54 |
| 5,818,936 | 10/1998 | Mashayekhi | 380/25 |
| 5,910,803 * | 6/1999 | Grau et al. | 345/357 |
| 5,948,055 * | 9/1999 | Pulsipher et al. | 709/202 |
| 6,069,895 * | 5/2000 | Ayandeh | 370/399 |

OTHER PUBLICATIONS

Feibel, Novell's Complete Encyclopedia of Networking, pp. 841–851, 1995.
Wang et al., "Routing for Mobility Support," pp. 1–11, 1996.
Tanenbaum, Computer Networks (3d. ed.), pp. 345–374, 1996.
"Neighbor Router Authentication," pp. 1–4, 1989–1997.

* cited by examiner

*Primary Examiner*—Viet D. Vu
(74) *Attorney, Agent, or Firm*—Computer Law++

(57) ABSTRACT

Methods, systems, signals, and devices are provided for managing and using topology information in a network. A topology information manager keeps fragments of network topology and provides access to entire fragments or to fragment summaries in response to authenticated requests. An authenticated path selector uses topology information from the manager to select message routes. The path selector may use summaries of hidden network paths to determine whether the hidden path is desirable, without having access to all topological information about the hidden path. Messages may be forwarded over hidden paths by the manager without disclosing more than the summary information to the message provider.

29 Claims, 4 Drawing Sheets

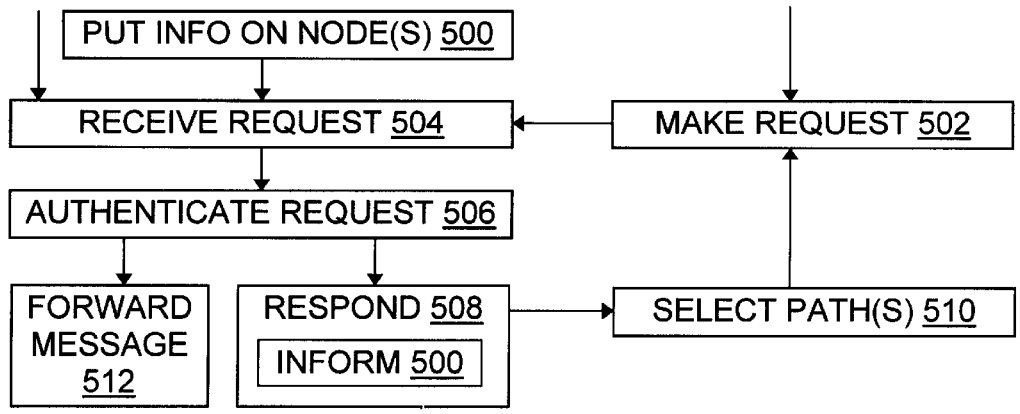
FIG. 5
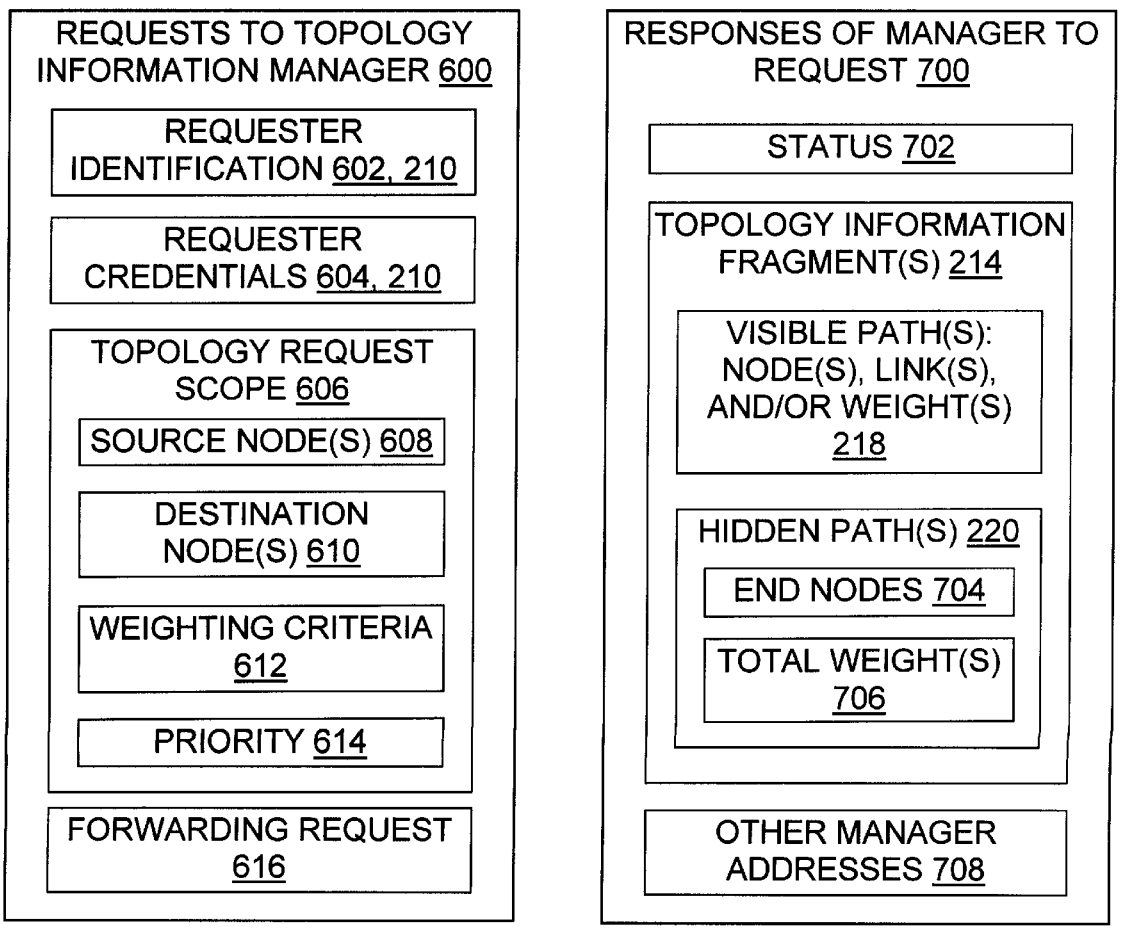
FIG. 6
FIG. 7

US 6,185,612 B1

SECURE DISTRIBUTION AND USE OF WEIGHTED NETWORK TOPOLOGY INFORMATION

FIELD OF THE INVENTION

The present invention relates to path selection in computer networks, and relates more particularly to providing secure but efficient access to information about costs associated with different paths in a network.

TECHNICAL BACKGROUND OF THE INVENTION

Computer networks are very flexible. A network can be viewed as a conduit for messages, in that data enters the network at one or more points, is transmitted through the network, and leaves the network at one or more other points. A network can also be viewed as a repository of data and/or as a source of data. A network is a repository if data enters the network at one or more points and travels to a storage location in the network. A network is a source of data if previously stored data or internally generated data travels out of the network or is sent to a different location in the network.

The flexibility of a given network arises in part from the internal organization of the network as a collection of linked nodes. When data is sent from one user to another, or between a user and a repository, the data travels in turn from node to node to node until it reaches its destination. Because data can often leave a given node over any of several links, a large number of routes may exist between any two nodes which are not immediate neighbors of one another. Often, however, some routes are better than others. The process of choosing a route in a particular situation is called "routing" or "route selection." Routes are sometimes called "paths."

Because route selection is both important and challenging, it has been the object of much study and experimentation. One set of challenges involves selecting appropriate ways to measure the costs associated with different network links and nodes. For instance, a weight may be associated with each link and each node in a network based on the item's measured or expected performance; the weight may reflect characteristics such as bandwidth, latency, reliability, memory size, and/or processor speed.

A second set of challenges involves mapping connectivity by identifying which links and nodes are connected. Various exploration protocols have been devised and applied to map the connections in networks. One main goal of such protocols is performing the mapping with the smallest necessary amount of network bandwidth and other resources. Another goal is providing sufficiently rapid updates when a node or link does down, is removed, is added, or returns to service.

Another set of challenges involves using topology information (information about weights and/or connectivity) to identify the desirable paths in a given network at a given time. Various methods can be used to identify the "best" route between two nodes, namely, the route having the lowest total weight. If the computing resources needed to identify the best route are too expensive, then "near-optimal" or "pretty good" routes may be identified instead.

Further challenges are posed by the question of when and how to update topology information. Updates may include changes to current routing information and/or the addition of wholly new routing information. Routing protocols such as the RIP (Routing Information Protocol) and OSPF (Open Shortest Path First) protocols allow routers to request and obtain information from neighboring routers about paths to other routers.

Instead of trying to compute the entire route from scratch each time, some systems store partial computational results and reuse them when possible. For instance, U.S. Pat. No. 5,321,815 issued to Bartolanzo, Jr. et al. describes a process for selecting a least weight path between two nodes in a network using partial trees which were created and cached in prior route selection operations.

Some systems also distribute the task of selecting a route. For instance, U.S. Pat. No. 5,398,012 issued to Derby et al. describes a distributed process for determining the best communication route from a source end station to a destination end station. Network nodes, at the interface between a wide area network ("WAN") and each subnetwork, contain access agents to control the communication flow between the wide area network and an end station in the subnetwork. The task of selecting the best route between two end stations is distributed between the access agents at the WAN interface in the first subnetwork and the access agents at the WAN interface in the second subnetwork.

However, previous work has not adequately addressed the problem of providing secured access to the network topology. In general, the route selection agents and processes in a given network have been given ready access to detailed information about the network's nodes and about the links between the nodes. In some networks, this poses a security risk, because such knowledge could be used to intercept or eavesdrop on communications, to masquerade as an authorized user, and/or to insert spurious data packets into the network.

Accordingly, it would be an advance to provide an approach to routing which takes advantage of existing tools but also enhances the security of network topology information, and which does so in an efficient manner.

Such an approach to secure network topology storage and use is described and claimed below.

BRIEF SUMMARY OF THE INVENTION

The present invention provides methods, systems, signals, and devices for secure access to a digital representation of a network topology and secure use of topology information. The digital representation of the topology may include a database, tables, linked lists, graphs, and/or other data structures representing the nodes and links and their capabilities. For convenience, the digital representation and the topology it represents are both referred to here as the topology. Suitable topologies include both conventional topologies and proprietary topologies now known and hereafter invented.

Pieces of topology information such as partial trees and hidden paths are stored at one or more locations throughout the network, on disk or other permanent media. The topology information may also be stored locally in a fast but volatile cache. Any given node does not necessarily have a complete description of the entire network topology, and the union of all information fragments is not necessarily complete. Moreover, since the network topology changes when a node or link goes down or is added, and since the topology may also change in response to varying loads on the network links, the fragments of topology information are not necessarily current. In general, however, the fragments are useful in selecting routes for data transmission within or across the network.

In some embodiments of the invention, the topology information on a given node is managed by a Topology Information Manager ("TIM"). The TIM may be implemented as an agent or other process which provides information both from and about the topology fragments it manages. Some of the fragments may be freely available, but the TIM provides access to other topology fragments only in response to authenticated requests. Conventional or proprietary authentication methods may be used to authenticate the requests. Thus, detailed information about some or all of the network's nodes and links is available only to authenticated users.

Topology Information Managers may be identified by a network-wide naming convention, or they may be located on specific nodes such as gatekeeper nodes, or they may be identified in a directory. If present, the directory may be a monolithic directory, or it may be a distributed directory such as a Novell Directory Services ("NDS") distributed directory.

In some embodiments a Path Selector gathers information about the network topology, using at least one TIM, and then selects a path. Like TIMs, Path Selectors may be monolithic or distributed. A given Path Selector may gather topology information from a combination of TIMs and other sources, or the information may be gathered using no source except TIMs. Using the gathered information, the Path Selector chooses a path which may be an optimal path, a near-optimal path, or some other type of path. In some embodiments, TIMs accept packets and transmit them between specified nodes without revealing the exact path(s) used, thereby allowing a Path Selector which does not have the right to view all of a topology fragment to nonetheless use summary information about a hidden path when selecting a path.

In short, the present invention provides tools and techniques for securely and efficiently managing and using network topology information which can be distributed in a computer network. In addition to those described above, other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 5 is a flowchart illustrating topology information management and use methods of the present invention.

FIG. 6 is a diagram illustrating a template for request signals to a Topology Information Manager according to the present invention.

FIG. 7 is a diagram illustrating a template for Topology Information Manager signal responses to a request such as that shown in FIG. 6.

DETAILED DESCRIPTION OF THE PREFERRED EMBODIMENTS

The present invention relates to methods, devices, signals, and systems for securely and efficiently managing and using network topology fragments which are located in a distributed computing environment. Suitable distributed environments include local area networks, wide area networks, the Internet, and/or other computer networks.

For convenience, definitions of several terms are provided below. These definitions are further refined by discussions and examples located throughout this document. "Internet" includes variations such as a private Internet, a secure Internet, a value-added network, a virtual private network, an extranet, or an intranet.

A "network" may include one or more LANs, wide-area networks, Internet servers and clients, intranet servers and clients, peer-to-peer nodes, network operating servers and clients, or a combination thereof.

A "computer" may be a workstation, laptop computer, disconnectable mobile computer, server, mainframe, so-called "network computer" or "thin client", personal digital assistant or other hand-held computing device, "smart" consumer electronics device or appliance, or a combination thereof.

A "key" includes one or more individual passwords, pass phrases, biometric scan results (e.g. retinal scan, fingerprint), asymmetric keys, symmetric keys, or other crypto-graphic or digital signature keys, email or other identifying codes, or any other data or device used to protect or control access to an account or another resource in the distributed system.

"User" may refer to an administrator, or it may refer to a non-administrative "regular" user. In either case, a user may be a person or it may be a software task or agent or other computer process acting legitimately on behalf of a person or a group of people.

Distributed Computing Systems

Figure 1:
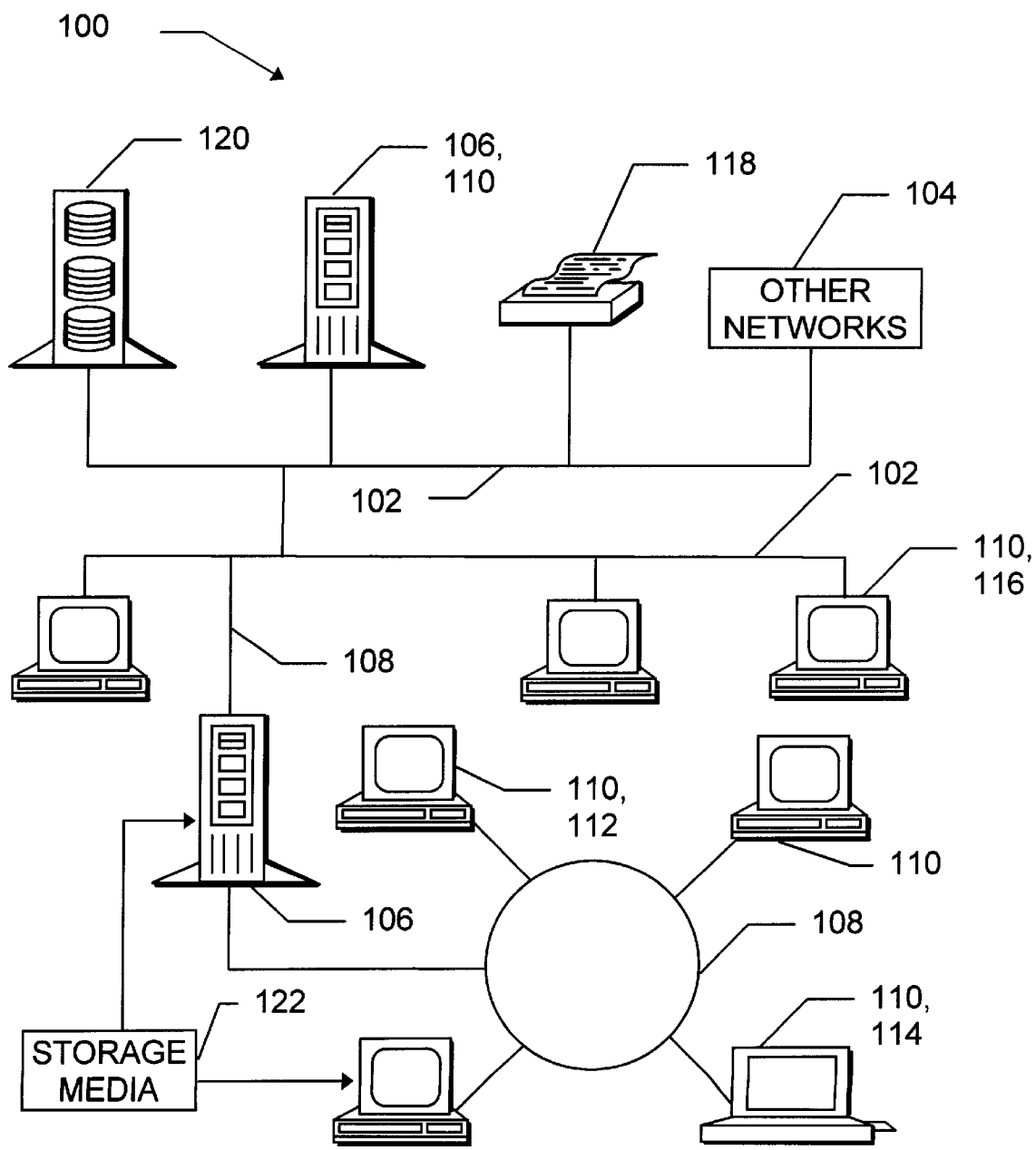
FIG. 1 is a diagram illustrating one of the many distributed computing systems suitable for use according to the present invention.

A portion of one of the distributed computing systems 100 suited for use with the present invention is shown in FIG. 1. In one embodiment, the system 100 includes Novell NetWare® network operating system software (NETWARE is a registered trade-mark of Novell, Inc.) and Novell Directory Services ("NDS") software. In alternative embodiments, the system 100 lacks NetWare and/or NDS software and includes NetWare Connect Services, VINES, RADIUS, TCP/IP, IPX, NetBEUI, NetBIOS, Windows NT, Windows 98, Windows 95, LAN Manager, and/or LANtastic network operating system software and/or an implementation of a distributed hierarchical partitioned object data-base according to the X.500 protocol or another directory service protocol such as the Lightweight Directory Access Protocol (VINES is a trademark of Banyan Systems; WINDOWS NT, WINDOWS 95, WINDOWS 98, and LAN MANAGER are trademarks of Microsoft Corporation; LANTASTIC is a trademark of Artisoft). The illustrated system 100 includes two local area networks 102 which are connectable to other networks 104, including other LANs or portions of the Internet or an intranet, through a gateway or similar mechanism. Other embodiments include a single network 102.

As shown, each network 102 includes one or more servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as web servers, as general file and print servers, as directory service providers, as name servers, as software component or servlet servers, as database servers, or as a combination thereof. The servers 106 may be uniprocessor, multiprocessor, or clustered processor machines. The servers 106 and clients 110 each include an addressable storage medium such as random access memory and/or a non-volatile storage medium such as a magnetic or optical disk, ROM, or flash memory.

Suitable network clients 110 include personal computers 112; laptops, pagers, cell phones, personal digital assistants, and other mobile devices 114; workstations 116; and dumb terminals. One or more of the servers 106 and/or one or more of the clients 110 may act as routers in a conventional manner and/or in a manner taught by the present invention. The signal lines 108 may include twisted pair, coaxial, or optical fiber cables, telephone lines, satellites, microwave relays, modulated AC power lines, RF connections, and/or other data transmission "wires" known to those of skill in the art. In addition to the network client computers 110, devices such as printers 118 or disk arrays 120 may also be attached to the network 102. A given computer may function both as a client 110 and as a server 106; this may occur, for instance, on computers running Microsoft Windows NT software. Although particular individual and network computer systems and components are shown, those of skill in the art will appreciate that the present invention also works with a variety of other networks, computers, and devices.

The servers 106 and many of the network clients 110 are often capable of using floppy drives, tape drives, optical drives or other means to read a storage medium 122. A suitable storage medium 122 includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices.

The physical configuration represents data and instructions which cause at least part of the computer system 100 to operate in a specific and predefined manner as described herein. Thus, the medium 122 tangibly embodies a program, functions, and/or instructions that are executable by the servers 106 and/or network client computers 110 to perform topology fragment management and use substantially as described herein.

Suitable software and/or hardware implementations according to the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Data Flow Overview

Figure 2:
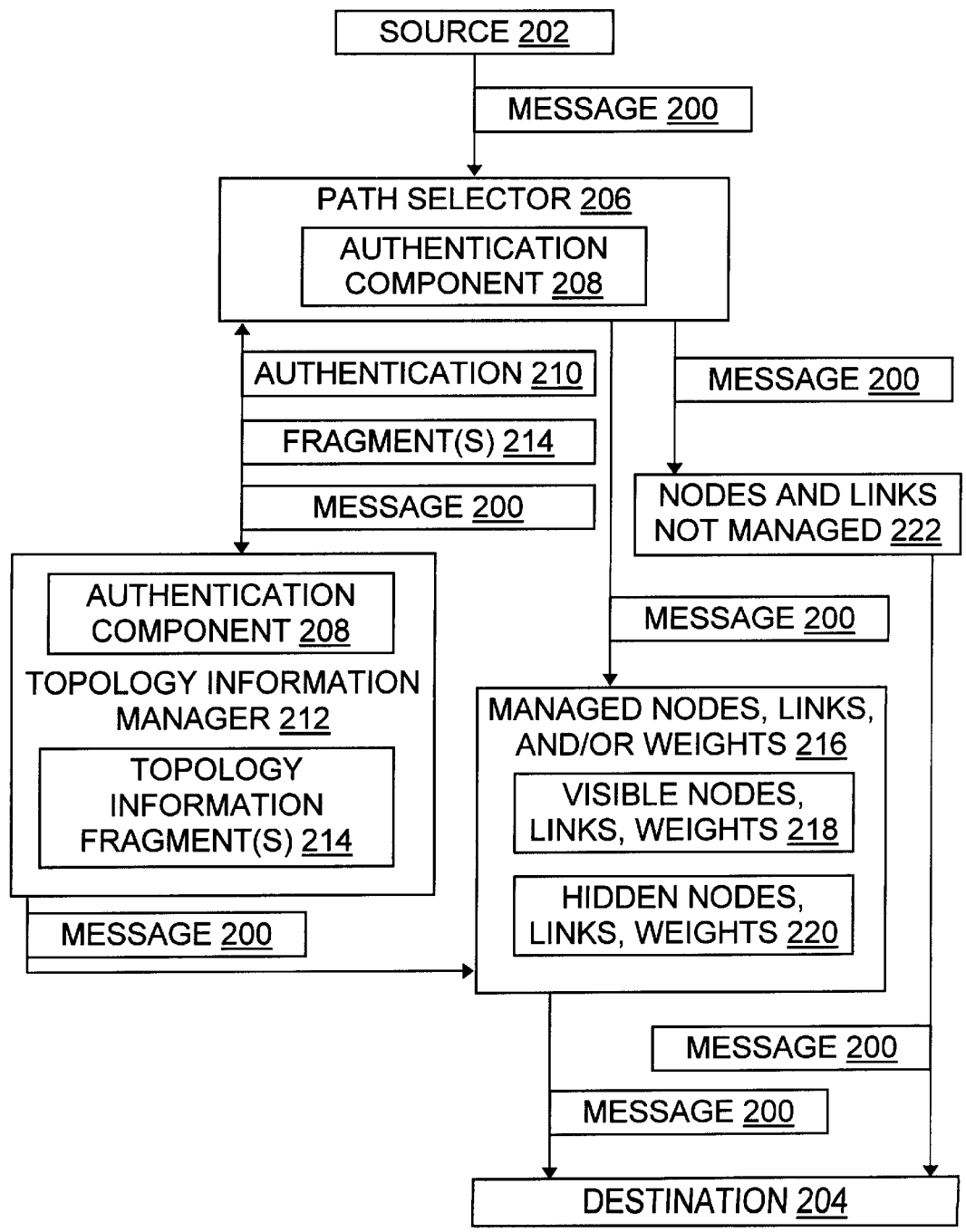
FIG. 2 is a data flow diagram further illustrating an embodiment of the invention in the system shown in FIG. 1.

FIG. 2 illustrates in a data flow diagram the components of one embodiment of the invention and related parts of a distributed system such as the system 100. In discussing FIG. 2, reference will also be made to FIG. 1.

A message 200 is to be sent from a source 202 to a destination 204 in a distributed computing system such as the network 100. In one embodiment, the source 202 sends the message to a path selector 206, which selects a path toward the destination 204 and sends the message 200 on its way. The path selected may take the message 200 all the way to the destination 204, or it may take the message 200 only part of the way, in which case the message 200 may be routed by other path selectors 206 or other routing tools before reaching the destination 204. In an alternative embodiment, the source 202 identifies the destination 204 to the path selector 206, which selects a path and informs the source 202; the source 202 then sends the message 200 on its way.

The path selector 206 includes several components, as discussed in greater detail below in connection with FIG. 3.

In particular, the path selector 206 includes an authentication component 208 for authenticating exchanges as discussed herein. The authentication component 208 may be implemented as a separate package or module, such as a NetWare Loadable Module. It may also take some other familiar form such as integrated code, or it may be a collection of one or more components or objects implemented using Java or .DLL or COM or OLE tools and techniques.

Authentication of the path selector 206 may be accomplished using a key (as defined above) with means and methods familiar to those of skill in the art. Based on its identity in the system 100, the path selector 206 has rights which are enforced by an access control system. Suitable rights may be defined in databases or in administrative files defining user accounts and user groups. A rights database may be integrated with a directory service, such as a Lightweight Directory Access Protocol service, a Novell NDS directory service (NDS is a mark of Novell, Inc.), or other X.500 directory service. Suitable access control systems may draw on conventional means and methods such as those employed by the Novell NetWare operating system, the Open System Foundation Distributed Computing Environment approach, and operating systems such as the UNIX, MULTICS, and Windows NT systems. Suitable access control systems may employ access control lists, capabilities, groups, permissions, tokens, credentials, and other authentication information.

The path selector 206 authentication component 208 sends authentication information 210 to a topology information manager 212. The authentication information may include information identifying the path selector 206, but in any case includes credentials, tokens, or other information that can be used to authenticate the request. The topology information manager 212 includes several components, as discussed in greater detail below in connection with FIG. 4. In particular, the topology information manager 212 includes an authentication component 208 for authenticating exchanges with the path selector 206 as discussed herein. The topology information manager 212 authentication component 208 may be functionally identical with the path selector 206 authentication component 208, as illustrated in FIG. 2. Alternatively, the topology information manager 212 and the path selector 206 may employ different but interoperable authentication components.

If the attempt of the path selector 206 to authenticate itself to the topology information manager 212 fails, then one or more of the following steps may be taken, depending on the embodiment involved: the manager 212 may grant the path selector 206 access to topology information 214 which is openly available to any user while refusing access to other information 214; the manager 212 may grant the path selector 206 limited access to topology information 214 on the basis of an earlier authenticated request; or the manager 212 may notify the system administrator and/or make a log entry summarizing the failed authentication attempt. Other options are described in connection with FIG. 5.

The topology information manager 212 controls access to one or more topology information fragments 214. A given topology information manager 212 may have a complete, current copy of the network topology, but does not necessarily have such a copy. Fragments 214 covering only a portion of the network and/or fragments 214 which are not entirely current may also be advantageously managed according to the invention.

In FIG. 2, these fragments 214 are resident in the manager 212, but they may also be kept elsewhere, such as at a hidden location and/or in an encrypted form. A copy of some or all fragments 214 may also be cached in RAM for faster access. The fragments 214 may be rebuilt and/or updated in response to an access request, or previously built fragments 214 may be provided on an "as is" basis. Familiar routing protocols, supplemented by authentication according to the invention, may be used by managers 212 to update their own routing tables and/or other sources of topology information.

Each fragment 214 includes information about the topology of the network 100 and/or other networks 104. The topology information 214 may include representations familiar in the art, with weights assigned by conventional or proprietary tools and techniques. Multiple weights may be assigned to a given link. For instance, the weight may be assigned on the basis of the speed of node's processor, the amount of memory available to a node's processor, the bandwidth of the "wire(s)" in a link, or some combination of these and other performance characteristics. The topology information 214 may be kept in the form of partial trees, weight graphs, or other linked structures. Topology information 214 may also be kept in the form of hidden paths, which include endpoints for a subnet without revealing all information about the topology between the endpoints.

If the request by the path selector 206 for topology information 214 is authenticated, then the manager 212 sends one or more topology information fragments 214 to the path selector 206. The path selector 206 uses the topology information 214, possibly in conjunction with topology information gained from other managers 212 and/ or other sources, by selecting a path for the message 200.

In some cases, the path selector 206 then sends the message 200 on its way; in other cases, the message 200 is given by the path selector 206 to the manager 212, which forwards the message 200 along a hidden path. If the message 200 is forwarded by the manager, the hidden path normally includes one or more links or nodes 220 that were not revealed by the manager 212 to the path selector 206. The path selector 206 may also select a path which lies in part or in whole along links and nodes 222 that were not among those whose information 214 is managed by the manager 212. In some cases a combination of visible 218, hidden 220, and/or non-managed 222 nodes and links is used as the message 200 travels toward the destination 204.

Hidden paths may be nested or used in series. For instance, a given message 200 may be forwarded by a first manager 212 along several nodes and links that are hidden by the first manager 212 from a path selector 206, after which the message 200 is given by the first manager 212 to a second manager 212 for forwarding along a second hidden path. The second manager 212 may hide nodes and links in the second path from both the first manager 212 and the path selector 206, or it may hide them from the path selector 206 only. At the end of the second hidden path, the message 200 may travel along nodes and links which are known to the first manager 212 but hidden from the path selector 206, or the message 200 may travel along nodes and links that are known to the path selector 206. The two hidden paths may be used because the two managers 212 have different security levels, because they require different keys, and/or because they contain fragments 214 describing different parts of the network.

Path Selector

Figure 3:
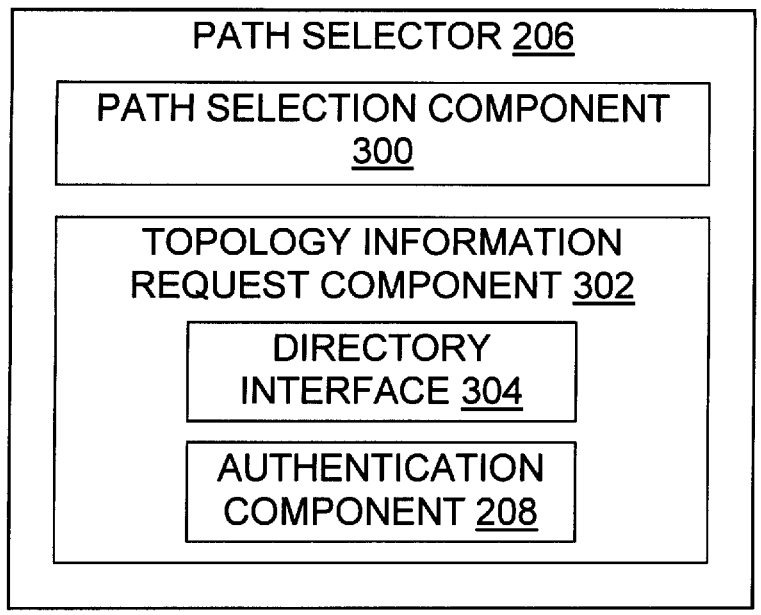
FIG. 3 is a diagram illustrating a Path Selector according to the present invention.

With continued reference to the earlier Figures, FIG. 3 further illustrates one embodiment of the path selector 206. A path selection component 300 evaluates network topology information and selects one or more paths over which the message 200 will be sent toward the destination 204. The path selection component 300 may use familiar or proprietary tools and techniques to select paths, and may make its selections according to various criteria. For instance, the path selection component 300 may traverse a weighted partial tree to identify a best path or a near-optimal path.

A topology information request component 302 makes requests for network topology information and provides the information it obtains to the path selection component 300 for possible use in the path selection process. The requests may be made at the behest of the path selection component 300, or they may be made proactively by the request component 302. The requests are provided with credentials, keys, and/or other authentication information by the authentication module 208. The requests may seek all available information from particular sources, such as the nearest manager 212, or they may seek all available information from all sources regarding a specified node or set of nodes, such as the source node 202 and/or the destination node 204. Requests are discussed further in connection with FIG. 6.

In some embodiments, one or more managers 212, and possibly other sources of topology information as well, are identified in a directory. The directory, which is accessed by the path selector 206 through a directory interface 304, may be implemented in various ways. The directory may be monolithic or distributed. It may include little more than a list of network addresses kept in a file of a specified name and maintained by hand. Or it may be a distributed directory which uses replicated partitions, such as a directory accessed through Novell Directory Services.

Topology Information Managers

Figure 4:
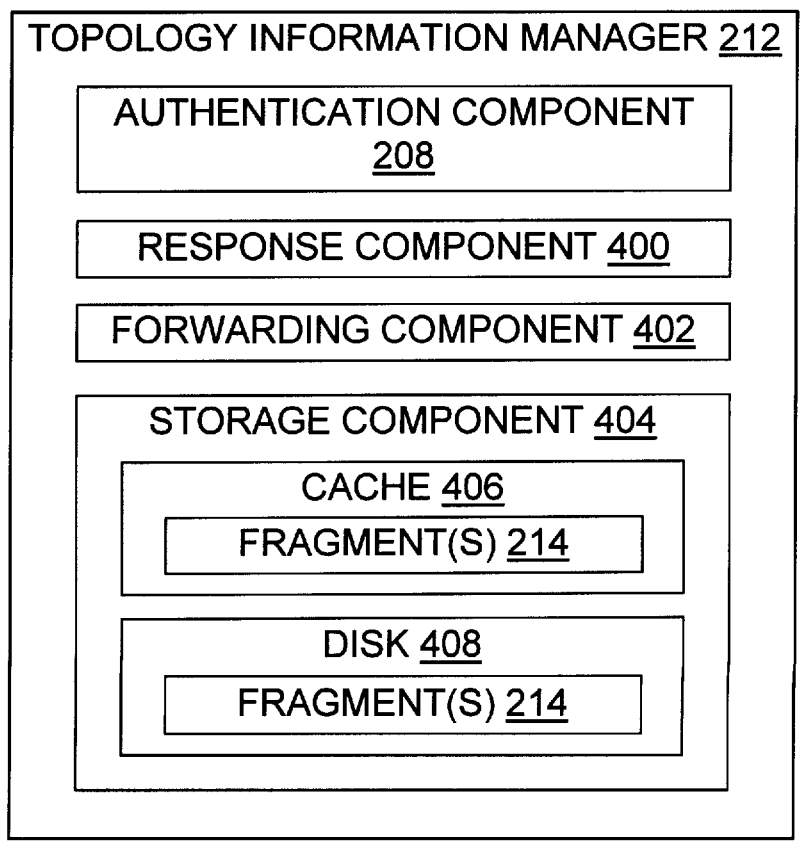
FIG. 4 is a diagram illustrating a Topology Information Manager according to the present invention.

With continued reference to the earlier Figures, FIG. 4 further illustrates one embodiment of the topology information manager 212. Requests for topology information 214 are authenticated by the authentication component 208; if authentication of a given request fails, that request is denied and/or brought to the attention of an administrator.

A response component 400 responds to authenticated requests for topology information 214 from path selector(s) 206 and possibly from other requesters as well. For instance, network resource inventory and management tools may utilize the manager 212 even if no router or path selector does. Responses are also discussed in connection with FIG. 7.

The responses provided vary according to the situation. If the request seeks information 214 which is access-restricted, and the authentication component(s) 208 do not authenticate the request, then the response may be as simple as "access denied", or it may direct the requester to other sources or to administrative personnel. On the other hand, some requests might always succeed. For instance, topology information 214 which is not access restricted may be managed by the manager 212 during initial system setup, or during system maintenance, or even during normal system operation for ease of administration. If the request seeks such unrestricted topology information 214, or the request is authenticated and seeks allowable access-restricted information, then the response component 400 provides the information 214 to the requester.

As discussed, the topology information 214 may include hidden paths, partial trees or graphs which have been previously built and then cached or otherwise stored, partial trees of graphs which are built in response to the request, or complete topologies for one or more networks. If hidden paths 220 are involved, a forwarding component 402 may be used to forward messages 200 along such paths. This capability allows the path selector 206 to take into consideration at least some of the network topology of the hidden paths before committing the message 200 to a path, without compromising the security of networks or network portions that are summarized by the hidden path information, and to use the hidden path if it is the most desirable path.

A storage component 404 stores the topology information 214 in a cache 406 and/or on disks 408 or other non-volatile media. The storage component 404 may interface with a distributed replicated partition database which contains topology information 214, or the information 214 may simply be kept on a local disk at each manager 212. Updates to topology information 214 may be kept locally only, or they may be propagated to other managers 212. Illustrative updates include information 214 which reflects the addition of one or more new nodes and/or links, the determination that one or more nodes and/or links are down, and weight changes corresponding to updated data about the performance of nodes and/or links.

Methods

FIG. 5 illustrates methods of the present invention. During an informing step 500, topology information 214 is placed on one or more nodes so that managers 212 can access it and use it in responding to requests from path selectors 206 and other requesters. As an alternative, or in addition to distributing previously generated topology information 214, the managers 212 may generate the information 214 by sending inquiry packets, measuring response times, and other familiar means.

As indicated by FIG. 5, the informing step 500 may also be delayed, so it is performed in order to respond to a particular authenticated request. More generally, even though FIG. 5 shows steps being performed in particular orders they may also be performed in other orders or concurrently, except when one step requires the result of another step.

During a request making step 502, a path selector 206 or other requester makes a request for topology information 214. Suitable request formats are discussed in connection with FIG. 6. During a receiving step 504, the request is received by the manager 212. Suitable means for transmitting the request to the manager 212 are well known in the art, including network communication tools and techniques as well as interprocess communication tools and techniques such as remote procedure calls and shared memory. In many cases the requesting step 502 and the receiving step 504 will be performed on different network nodes, but the requester and the manager 212 may also run on the same node in some embodiments.

During an authenticating step 506, the manager 212 authenticates the request. As discussed above, administrative tracking steps such as logging the attempt or emailing an administrator can be taken if the attempted authentication fails. If the authentication succeeds, then a copy of the available topology information 214 to which the requester is entitled is sent to the requester; alternatively, a read-only original of the information 214 is made available to the requester. The topology information 214 and/or other response is sent to the requester during a responding step 508. Responses are discussed further in connection with FIG. 7.

During a path selecting step 510, a requesting path selector 206 uses the topology information 214 to select one or more paths. The selected path may include a hidden path 220, in which case another requesting step 502 requests that the message 200 be forwarded by the manager 212 along the hidden path 220 during a forwarding step 512. For instance, one of many possible sequences of steps in the embodiment shown is to request 502 topology information, receive 504 the request, authenticate 506 the request and/or the requester, respond 508 by providing topology information about a hidden path, select 510 a path which includes the hidden path, request 502 that the message be forwarded along the hidden path, receive 504 the forwarding request, authenticate 506 the forwarding request, and then forward 512 the message. Path selection and forwarding are also discussed in connection with FIG. 2 and elsewhere.

Topology Information Request

One suitable signal format for making requests to one or more managers 212 is shown in FIG. 6. A request 600 includes a requester identification component 602 which identifies the user that is making the request. The requesting user may be a path selector 206, a topology information manager 212, or some other user. Identification is provided by a user ID, process ID, GUID, UUID, account number, name, public key, private key, symmetric key, token, or other identification means; many suitable identification means are familiar in the art.

An authentication component of the request 600, such as the requester's credentials 604, may be present. Alternatively, the requester identification 602 may serve both to identify the user and to authenticate the request 600. The authentication component includes sufficient information, such as an account password, data from a magnetic card, data from a biometric scan, and/or certificate or other credential, to determine whether the requesting user is entitled to the topology information 214 it seeks. In the case of requests 600 which include routing table 214 updates from the requesting user, the authentication component includes sufficient information to determine whether the requesting user is a trusted source of updates to managed fragments 214.

Suitable certificates include, without limitation, certificates issued by a Certification Authority. A Certification Authority may be a dedicated and/or centralized certification authority of the type found in a public key infrastructure, or it may be an alternative certification authority such as a member of a PGP (Pretty Good Privacy encryption infrastructure) or other web of trust. Authentication methods and tools are well-known in the art, at least with respect to their use in authenticating individual users.

A topology information scope definition such as the request scope 606 indicates the nature and scope of any topology information being requested or, in the case of an update, any topology information being provided. In the illustrated embodiment, the scope 606 includes a list or table 608 identifying one or more source nodes, another list or table 610 identifying one or more destination nodes, weighting criteria 612, and an indication 614 of the relative priority of the request 600.

For instance, a given request 600 might identify source node A, destination node B, weighting criteria "Secure Sockets Layer available", and priority "low" for a weekly log archiving message 200 from an administrator on node A to an administrative archive process on node B. Another request 600 might identify the administrator's node as the source node, all departmental workstations as destination nodes, no specific weighting criteria, and a high priority for a message 200 warning that the system 100 is going off-line in five minutes for maintenance. Those of skill will identify many other instances of the request 600 which are suitable for particular situations, and/or suitable as defaults that may or may not be overridden by users, depending on the embodiment.

Some requests 600 include a request 616 to forward one or more messages 200 along hidden paths 220 previously identified by the manager 212. Some requests 600 include a request 616 to forward one or more messages 200 along any path, hidden or visible, which has a cost less than some specified threshold. Some requests 616 ask the manager 212 to forward the messages 200 along any appropriate hidden path 220, but only if no visible paths to the destination 204 can be shown to the requester.

In alternative embodiments, one or more of the elements 606 through 616 are omitted. For instance, the request scope 606 may be implicitly defined as "everything you have" if no source or destination nodes are identified in the request 600. Likewise, some embodiments may assign weights using only one approach, so there is no reason to indicate which weighting criteria are of interest to the requester. Some embodiments may operate strictly on a first-come-first-served basis, so the priority of a given request 600 relative to other requests depends only on when the request is received. Some requests 600 seek only topology information 214 and hence omit the forwarding request 616, while other requests 600 omit the scope definition 606 but contain a forwarding request 616.

More generally, signal components, method steps, and system components shown in the Figures or discussed in the specification text may be omitted from some claimed embodiments, regardless of whether they are expressly described as optional in the specification. Conversely, claims may clarify or add steps or components, or repeat them. Steps and components may also be named differently. In addition, those of skill in the art will recognize when descriptions provided in connection with one step or component also pertain to another step or component, thereby making explicit repetition of the description unnecessary. To give but one example, the various ways of making a request during step 502 and the components of the request 600 are clearly related.

Responses to Topology Information Requests

FIG. 7 illustrates signal formats for responses from manager(s) 212 to users who sent requests 600. A manager response 700 includes a status field 702 containing a status value, status flag, or other indication of the general nature of the manager's response. If the authentication succeeded and the requested operation (such as "get topology information", "forward message", or "update your tables with this information") succeeded, then the status 702 will so indicate. However, in some embodiments the status is implicit in other components of the response 700. For instance, if topology information 214 was requested and is supplied in the response 700, then the status may be implicitly understood to be "OK." If the requested operation partially or entirely failed, then the status 702 may provide some indication of the reason for failure, such as "authentication failed", "manager down for maintenance; try manager at address X", or "generating/updating topology information; please try again later".

If the request 600 sought topology information and the information 214 is available and the requester is authorized to access it, then the response 700 includes the information 214. The topology information 214 may include visible paths 218 in the form of one or more nodes, links, and/or weights which are represented as tables, lists, trees, graphs, or other data structures known in the art.

Instead of visible paths 218, or in addition to such paths 218, the topology information 214 may include hidden paths 220. Each hidden path 220 includes at least two end nodes 704. In the illustrated embodiment, each hidden path 220 also includes one or more total weights 706 so the path selector 206 can select paths on the basis of the hidden path 220 as a whole even though the path selector 206 lacks detailed information about some individual nodes, links, and/or weights inside the hidden path 220.

Note that paths in the response 700 may be hidden even when the corresponding request 600 is authenticated. The system 100 may be configured so that unauthorized users have no information about hidden paths 220 (not even the fact they exist), while some of the authorized users receive only summary information such as the end nodes 704 and total weight 706.

The illustrated response 700 also includes a list or table 708 of other manager 212 addresses. Such a list 708 may be provided in response to an explicit request by the path selector 206 directory interface 304. Alternatively, the list 708 could be provided when the manager 212 in question does not have all the topology information 214 sought in the request 600. For instance, the given manager 212 might have no information regarding some or all of the destination nodes 610 specified in the request 600 but might also have the address of another manager 212 that is closer to those nodes 610.

Conclusion

The present invention provides improved tools for managing and using topology information in a distributed computing system. Distributed topology information managers provide efficient yet controlled access to confidential topology data. Familiar authentication techniques can be used with the invention, and existing user rights databases may also be used. The invention can use either conventional or proprietary path selection criteria.

The invention may be embodied in other specific forms without departing from its essential characteristics. The described embodiments are to be considered in all respects only as illustrative and not restrictive. As used here, the term "includes" means "includes, without limitation" or "comprises," rather than meaning "consists of." Any explanations provided herein of the scientific and organizational principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A topology information manager in a distributed computer system, the topology information manager comprising:
   an authentication component for authenticating requests regarding information about the topology of at least a portion of the distributed computer system;
   a response component for providing responses to such requests; and
   a storage component for storing topology information, the storage component being configured by topology information in the form of a hidden path which includes an identification of at least two end nodes of a hidden path and which omits topology information about at least one path between the two end nodes.

2. The topology information manager of claim 1, wherein the storage component comprises a volatile memory cache.

3. The topology information manager of claim 1, further comprising topology information in the form of a partial tree representing at least two nodes and at least one link in the distributed computer system.

4. A computer storage medium having a configuration that represents data and instructions which will cause performance of method steps for managing network topology information in a computer network, the method comprising the steps of:

receiving a topology information management request;

authenticating the request; and managing hidden path topology information in response to the authenticated request.

5. The topology information manager of claim 1, further comprising a forwarding component for receiving a data packet and forwarding it over a hidden path without fully disclosing the topology of the hidden path.

6. The topology information manager of claim 1 in combination in the distributed computer system with a path selector, the path selector comprising:

a request component for making an authenticated request to the topology information manager and receiving a response; and a path selection Component for selecting at least one path based at least in part on topology information provided in response to the authenticated request.

7. The topology information manager of claim 1, wherein the topology information manager is located on a single node of the distributed computer system.

8. The topology information manager of claim 7 in combination with at least one other topology information manager which is located on at least one other node of the distributed computer system.

9. A path selector in a distributed computer system, the path selector comprising:

a request component for making an authenticated request for topology information and receiving a response; and a path selection component for selecting at least one path based at least in part on topology information provided in response to the authenticated request, the path selection component configured to select a path using topology information in the form of a hidden path which includes an identification of at least two end nodes of a hidden path and which omits topology information about at least one path between the two end nodes.

10. The path selector of claim 9 in combination with a directory identifying at least one source of topology information.

11. The path selector and directory combination of claim 10, wherein the directory includes distributed replicated partitions.

12. The path selector and directory combination of claim 11 in further combination with a topology information manager identified in the directory, the topology information manager comprising:

an authentication component for authenticating requests for access to topology information;

a response component for providing responses to such requests; and a storage component for storing topology information.

13. The path selector of claim 9, wherein the path selector is located on a single node of the distributed computer system.

14. The path selector of claim 13 in combination with at least one other path selector which is located on at least one other node of the distributed computer system.

15. A set of data signals embodied in a network connection for topology fragment management, the data signals comprising:

at least one topology information management request made by a requester;

at least one authentication signal containing identification and credential data of the requester; and at least one topology information hidden path signal which includes an identification of at least two end nodes of a hidden path and which omits topology information about at least one path between the two end nodes.

16. The data signals of claim 15, further comprising at least one response to a topology information request in the form of a partial tree representing a portion of network topology.

17. The data signals of claim 15, further comprising at least one data packet and a corresponding request that the data packet be forwarded over a hidden path.

18. The data signals of claim 15, wherein the management request is a topology information update request from a first topology information manager to a second topology information manager.

19. A method for managing network topology information in a computer network, comprising the steps of:

receiving a request for topology information about the network;

authenticating the request;

providing topology information in response to the authenticated request; and selecting at least one path based at least in part on at least one hidden path provided by the providing step.

20. The method of claim 19, further comprising at least two informing steps, each of which furnishes a different node in the network with topology information to be provided in response to an authenticated request.

21. The method of claim 19, further comprising the step of selecting at least one path based at least in part on at least one partial tree provided by the providing step.

22. The configured storage medium of claim 4, wherein the managing step updates topology information in a topology information manager in response to the authenticated request.

23. The method of claim 19, wherein the selecting step selects a path including at least two hidden paths.

24. The method of claim 19, wherein the request is from a requester on a requesting node to a provider on a providing node, and the requesting node is different from the providing node.

25. The method of claim 19, wherein the request is from a requester to a provider, and the requester and provider are on the same node.

26. The method of claim 19, wherein the request is from a requester to a provider, and the method further comprises the steps of sending data from the requester to the provider and then forwarding the data over a hidden path from the provider without first fully disclosing the topology of the hidden path to the requester.

27. The configured storage medium of claim 4, wherein the managing step provides topology information to a path selector in response to the authenticated request.

28. The configured storage medium of claim 27, further comprising the step of selecting at least one path based at least in part on topology information provided during the providing step.

29. The configured storage medium of claim 4, wherein the request is from a requester to a provider, and the method further comprises the steps of sending data from the requester to the provider and then forwarding the data over a hidden path from the provider without first fully disclosing the topology of the hidden path to the requester.

* * * * *